3,182,069
NOVEL STEROID COMPOUNDS AND PROCESS FOR PREPARING SAME
Raphael Mechoulam, 86 Shlomo Hamelech St., Tel-Aviv, Israel
No Drawing. Filed May 3, 1963, Ser. No. 277,725
4 Claims. (Cl. 260—308)

It is an object of the present invention to provide novel steroid compounds. It is a further object of the present invention to provide novel steroid compounds which may be designated as tetrazolo-A-homo-androstanes. It is yet a further object of the present invention to provide a novel process for the production of tetrazolo-A-homo-androstanes. Other and further objects of the invention will become apparent hereinafter.

The novel compounds according to the present invention are of the general formulae

I    II

The compound (I) may have a $\Delta^{4a(5)}$-double bond, and the rings A, B, C and D may be further substituted. The 17-beta hydroxy group may be esterified with a lower aliphatic acid.

The novel steroids according to the present invention may be prepared by reacting the corresponding 3-keto-steroid with hydrazoic acid and with boron-trifluoride etherate. Further substituents may be introduced subsequently into the compound after this reaction, if so desired.

A better and fuller understanding of the invention may be had by referring to the following examples, which are to be construed in a non-limitative sense and by referring to the following claims.

Example 1

A solution of 2 g. 5α-androsta-3-one-17β-ol in 50 ml. chloroform was added to a solution of 4 g. hydrazoic acid in 40 ml. chloroform. The resulting solution is added gradually to a solution of 5 ml. boron-trifluoride etherate in 25 ml. chloroform and stirred during 12 hours at ambient temperature. The solution is decanted, washed with ice-cold water, with 5% aqueous sodium hydroxide and dried over sodium sulfate. The residue remaining after the decantation is dissolved in methanol and added to the chloroformic solution, which is evaporated to dryness. The crude product is chromatographed on 100 g. neutral alumina and eluted with ether/chloroform (4:1) and recrystallized from methanol. The product had a M.P. 248–250° C., no absorption band in the U.V. range of 215–330 mμ, strong absorption starting at about 220 mμ. $(\alpha)_D^{20°}$ +4° (dioxane).

*Analysis.*—Calculated for $C_{19}H_{30}ON_4$:

C(%)—69.05, found: 69.18.
H(%)—9.15, found: 9.00.
O(%)—4.84.
N(%)—16.96, found: 16.80.

The product consists of a mixture of the two compounds (I) and (II) defined above, namely 1'-H-tetrazolo - [1',5'-c] - 3 - aza-A-homo-5-alpha-androsta-17-beta-ol and 1'-H-tetrazolo-[5',1'-c]-4-aza-A-homo-5-alpha-androsta-17-beta-ol.

Example 2

A solution of 1 g. testosterone in 35 ml. benzene was added to a solution of 2 g. hydrazoic acid in 20 ml. benzene and the resulting solution was added dropwise to 5 cc. boron-trifluoride etherate in 15 ml. benzene. After stirring 12 hours at 35° C. the benzenic solution was washed with 5% aqueous sodium hydroxide and evaporated to dryness. The crude product was chromatographed on 50 g. neutral alumina, eluted with ether/chloroform (4:1) and recrystallized from acetone. There was obtained 1'-H - tetrazolo - [1',5'-c]-3-aza-A-homo - $\Delta^{4a(5)}$ - androsten - 17 - beta - ol, M.P. 241–242° C.

*Analysis.*—Calculated for $C_{19}H_{28}ON_4$:

C(%)—69.47, found: 69.90.
H(%)—8.59, found: 8.91.
N(%)—17.06, found: 17.50.

This compound has a maximum absorption in the UV at 244 mμ $(\alpha)_D^{20}$ −18 (dioxane). The yield was 70%, calculated on the starting material.

The administration of these compounds resulted in a marked reduction of testicular weight in rats. They have also a pronounced anti-fertility and anti-spermatogenic activity. Such compounds may be used for various pharmaceutical purposes and may serve as male contraceptive agents.

What I claim is:
1. 1' - H - tetrazolo - [1',5'-c] - 3 - aza - A - homo - 5 - alpha - androsta - 17 - beta - ol.
2. 1' - H - tetrazolo - [5',1'-c] - 4 - aza - A - homo - 5 - alpha - adrosta - 17 - beta - ol.
3. 1' - H - tetrazolo - [1',5'-c] - 3 - aza - A - homo - $\Delta^{4a(5)}$ - androsten - 17 - beta - ol.
4. A process for the production of tetrazolo-A-homo-androstanes which comprises reacting the corresponding steroid compound with hydrozoic acid and boron trifluoride etherate and working up by conventional means.

No references cited.

IRVING MARCUS, *Primary Examiner.*
NICHOLAS S. RIZZO, *Examiner.*